No. 876,174.
PATENTED JAN. 7, 1908.
M. HALL.
SAP COLLECTOR.
APPLICATION FILED OCT. 2, 1907.
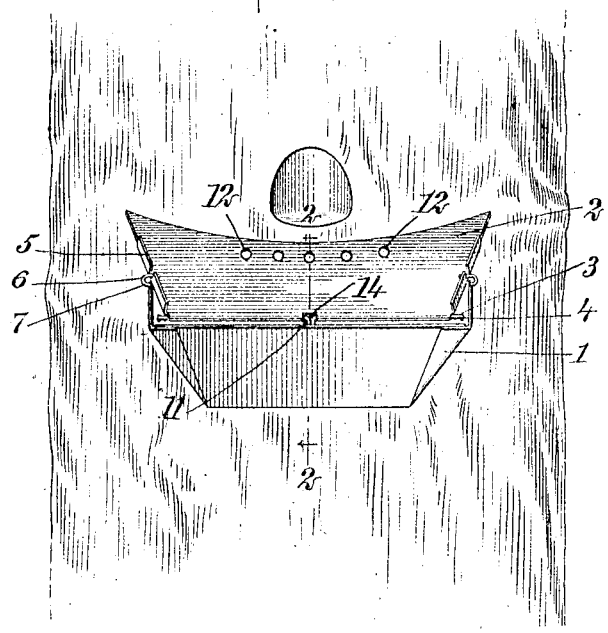
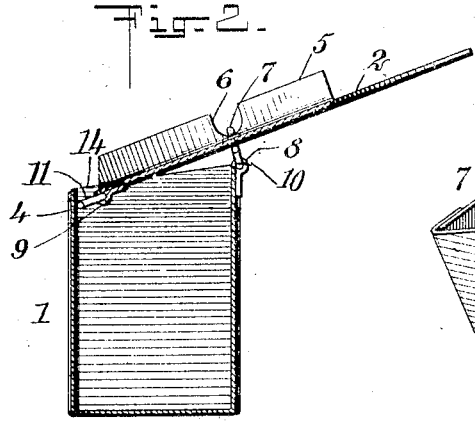
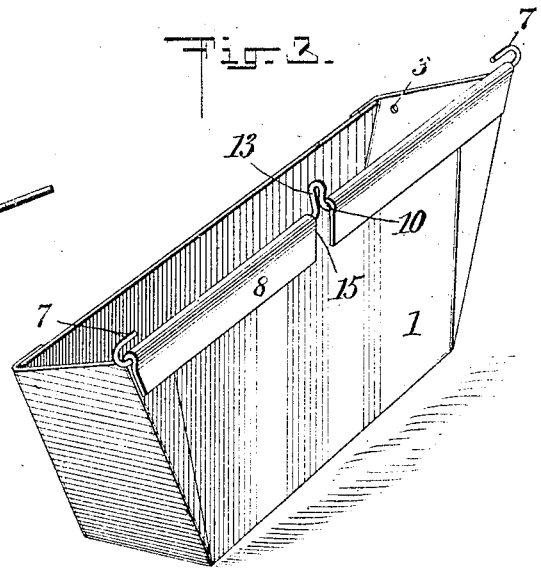
WITNESSES
INVENTOR
Moss Hall
BY
ATTORNEYS

UNITED STATES PATENT OFFICE.

MOSS HALL, OF DE FUNIAK SPRINGS, FLORIDA.

SAP-COLLECTOR.

No. 876,174.  Specification of Letters Patent.  Patented Jan. 7, 1908.

Application filed October 2, 1907. Serial No. 395,495.

*To all whom it may concern:*

Be it known that I, MOSS HALL, a citizen of the United States, and a resident of De Funiak Springs, in the county of Walton and State of Florida, have invented a new and Improved Sap-Collector, of which the following is a full, clear, and exact description.

This invention relates to sap collectors and is particularly useful in gathering sap from trees and the like.

The object of this invention is to provide a sap collector so constructed that the contents are protected from contamination by foreign substances, and which can easily and firmly be secured to a tree or other support.

The invention consists in the construction and combination of parts, to be more particularly described hereinafter and particularly set forth in the claims.

Reference is to be had to the accompanying drawings forming a part of this specification, in which similar characters of reference indicate corresponding parts in all the figures, in which Figure 1 is a front view showing the device attached to a tree; Fig. 2 is a sectional view on the line 2—2 of Fig. 1, showing the method of attaching the apron to the box, and Fig. 3 is a perspective view of the sap collector, showing the fastenings on the box for securing the apron in position.

Before proceeding to a more detailed description, it should be understood that my invention includes a box suitably formed for the purpose and provided with an apron partially covering the opening and held firmly at its lower end by wire retainers which pass through openings in the sides of the collector and further held at a second point by bent wire catches which extend through openings in flanges of the apron. This double point suspension of the apron is of great advantage, in that the collector is held much more firmly and evenly, and the chance of its being shaken from the tree by the wind or by live stock is considerably lessened, as the collector is mounted in position by means of the apron which extends beyond the box for the purpose. Furthermore, the front of the apron being extended to within a very short distance of the outer edge of the collector, all injurious substances are kept from falling into the sap, which has already been gathered, and therefore, a higher grade material at less cost for labor, is produced. It also shields the contents of the cup from the sun and lessens evaporation; while during storms, the rain either splashes off the apron or drips into the cup, in either case, no part of the contents is driven out by the force of the rain.

Referring more particularly to the drawings, 1 represents a sap box of the ordinary type, having an apron 2 made from any material, such as galvanized iron, tin or the like, and suitably fashioned at its upper edge to be secured to a tree, by insertion into notches or gashes. To facilitate this, the corresponding edge is curved.

The box is preferably formed of material similar to that of the apron, and has the back at the upper edge folded upon itself to form a sleeve 8, for a purpose that will appear hereinafter. It will be understood that the box can be of any size or form for convenient use. The apron 2 is firmly secured by a wire 4, arranged in a sleeve 9 formed at the lower edge of the apron by folding the material back upon itself, the wire projecting laterally beyond the apron and having the extremities arranged in openings 3 at the sides of the box. Near the center of the sleeve 9 is provided an opening 14, through which projects a laterally-disposed loop 11 of the wire 4, formed by suitably bending the latter. The loop serves to hold the wire against lateral displacement. The arrangement is such that the apron extends over most of the opening and protects the contents, the sap entering the box between the forward edge of the apron and the front of the box, the flow being assisted by the inclined position. Openings 6 are so located in these flanges that the ends 7 of a wire 10 carried in the sleeve 8 can engage the same to hold the apron in position. The ends of the wire 10 are bent to form catches. It should be understood that the ends of the wire 10, may be bent to produce catches of any desired shape.

The sleeve 8 presents a substantially central recess 15, which permits the projection therethrough of a loop 13 formed in the wire 10. The loop serves as a support for the apron 2 and as an additional safeguard against the lateral displacement of the wire.

The apron 2 is preferably provided with a plurality of openings 12 therethrough, which catch and retain the adhesive constituents of the tree sap, permitting these to harden and thereby assist in securing the device in position upon the tree trunk.

Having thus described my invention, I claim as new and desire to secure by Letters Patent:

1. In a device of the class described, a sap box, and a perforated apron, said apron having a pivotal connection with said box and extending partly over the same, said apron further being extended beyond said box and being adapted to be secured removably to a support, said apron being formed to engage the front of the box.

2. In a device of the class described, a sap box, and an apron, said apron having a pivotal connection with said box and extending partly over the same, said apron further having projections at the lower edge thereof, adapted to secure it to the sides of said box and being provided at the forward edge with a projection adapted to engage at the forward side of the box.

3. In a device of the class described, a sap box having a perforated apron mounted thereupon, said apron having flanges adapted to guide the sap into the box, said flanges having openings, catches mounted upon said sap box and adapted to form pivotal connection with said apron at said openings and means at the lower edge of said apron whereby it may be secured to said sap box.

4. In a device of the class described, a sap box, an apron mounted thereupon, the back edge of said box forming a sleeve, and an elongated member arranged within said sleeve and extending laterally therebeyond, the extending ends of said elongated member constituting catches for pivotally securing said apron, said apron at the front edge being provided with an elongated member having laterally extending ends adapted to engage the sides of the box.

5. In a device of the class described, a sap box, an apron mounted upon said sap box, said apron having a sleeve at its forward edge, and a wire member arranged within said sleeve and projecting therebeyond for securing said apron in position.

6. In a device of the class described, a sap box having a removable apron and openings in the sides, said sap box having the back formed into a sleeve, a wire mounted within said sleeve and projecting therebeyond, said apron having its lower edge turned back to form a sleeve, a wire mounted therein and projecting beyond the ends of the same and adapted to engage openings in the sides of said box, said apron having flanges to guide the sap into the box, said flanges having openings adapted to receive the ends of said wire mounted in said sleeve at the back of said box.

7. In a device of the class described, a sap box provided with openings in the sides thereof and having a perforated, removable apron, said sap box further having the back formed into a sleeve, a wire mounted within said sleeve and projecting therebeyond, said wire having its ends bent to hold said apron in place, said apron having its lower edge turned back to form a sleeve, a wire mounted therein and projecting beyond the ends of the same and adapted to engage the openings in the sides of said box, said apron having flanges to guide the sap into the box, said flanges having openings adapted to receive the ends of said wire mounted within said sleeve at the back of the box, said sleeves having openings intermediate the ends thereof, said wires being bent to form projections extending through said openings of said sleeves.

In testimony whereof I have signed my name to this specification in the presence of two subscribing witnesses.

MOSS HALL.

Witnesses:
  G. B. CAMPBELL,
  A. G. CAMPBELL.